(12) United States Patent
Kao

(10) Patent No.: US 7,011,906 B2
(45) Date of Patent: Mar. 14, 2006

(54) BATTERY FOR AN ELECTRICAL APPLIANCE THAT CONSUMES LOW VOLTAGE BATTERY

(76) Inventor: Sung-Nien Kao, 3F, No. 18, Alley 11, Lane 26, Sec. 1, Chungshun St., Taipei (TW)

( * ) Notice: Subject to any disclaimer, the term of this patent is extended or adjusted under 35 U.S.C. 154(b) by 540 days.

(21) Appl. No.: 10/334,223

(22) Filed: Dec. 31, 2002

(65) Prior Publication Data

US 2004/0125527 A1    Jul. 1, 2004

(51) Int. Cl.
- H01M 2/14 (2006.01)
- H01M 2/04 (2006.01)
- H01M 2/36 (2006.01)
- H01M 6/32 (2006.01)
- H01M 4/46 (2006.01)

(52) U.S. Cl. .................. 429/132; 429/72; 429/118; 429/164; 429/177; 429/188; 429/220; 429/231.6

(58) Field of Classification Search .............. 429/132
See application file for complete search history.

(56) References Cited

U.S. PATENT DOCUMENTS 2,855,451 A * 10/1958 Piroux .................. 320/166
5,449,574 A * 9/1995 Higley .................. 429/152

FOREIGN PATENT DOCUMENTS

JP    79001891 B * 1/1979

* cited by examiner

Primary Examiner—Jonathan Crepeau
(74) Attorney, Agent, or Firm—William E. Pelton, Esq.

(57) ABSTRACT

A battery for electrical appliances that consume low voltage battery has a body containing a fluid material that is composed of active carbon and water therein, two conductive rods functioning as the opposite electrodes of the battery and extending into the body, and a water receptacle attached to the body. Water stored in the receptacle is able to be drawn into the body via a water absorbent bar to react with the two conductive rods. With such an arrangement, a chemical reaction of the two electrodes and water generates electricity to provide to an electrical appliance.

2 Claims, 1 Drawing Sheet

BATTERY FOR AN ELECTRICAL APPLIANCE THAT CONSUMES LOW VOLTAGE BATTERY

BACKGROUND OF THE INVENTION

1. Field of the Invention

The present invention relates to a battery for an electrical appliance that consumes low voltage battery, and more especially to a battery that utilizes the copper and the alloy of aluminum and magnesium as the two opposite electrodes, wherein water is provided to surround the two electrodes. With such an arrangement, the battery is able to generate minor electricity caused from a chemical reaction among the two electrodes and the water.

2. Description of Related Arts

Due to the increasing awareness of the need for environmental protection, people gradually realize that the limited natural resources may possibly be exhausted soon. Therefore, significant scientific resources have been devoted to the development of new energy forms having lower pollution, especially in the field of electricity development.

The well known power supply means, the battery, has also been improved to mitigate its contamination to the environment. For example, a salt solution in accompaniment with zinc and copper that are respectively applied as the cathode and anode for a battery, are able to generate electricity for providing power to a small electrical appliance, such as the calculator. However, such a zinc-copper battery still has some shortcomings needing to be overcome.

During the chemical reaction of the two electrodes and the salt solution, an electrolyte residue is generated and clouds the salt solution. As a result, the electricity generating ability of the battery is accordingly decreased and the salt solution must be refreshed which is inconvenient since the battery must be close to the source of salty water. Moreover, since the salty water is used as the electrolyte, the cathode deteriorates too quickly.

To overcome the shortcomings, the present invention provides a battery that is applied to the electrical appliance to mitigate and obviate the aforementioned problems.

SUMMARY OF THE INVENTION

The objective of the present invention is to provide a battery applied to the electrical appliance that consumes little electricity. The electricity is generated from a chemical reaction of copper and the alloy of the magnesium and aluminum, wherein water is used as the electrolyte in the chemical reaction.

A hollow body has a top opening and a bottom opening that respectively are enclosed with a cap and a stopper, wherein two conductive rods extend through the cap into the body for contacting with active carbon contained in the body, and a water absorbent bar is inserted through and held by the stopper. The two conductive rods act as opposite electrodes of the battery, one is composed of copper and the other one is composed of the alloy of the magnesium and aluminum. A receptacle contained with water is detachable attached to the stopper, wherein two opposite ends of the water absorbent bar respectively extend into the body and the receptacle. With such a structure, the water absorbent bar can absorb water from the receptacle to the body for the purpose of creating a chemical reaction. Further, the receptacle is easily detached from the battery for convenient water resupply when the water in the receptacle is exhausted.

The features and structure of the present invention will be more clearly understood when taken in conjunction with the accompanying figures.

DETAILED DESCRIPTION OF THE PREFERRED EMBODIMENT

Figure 1:
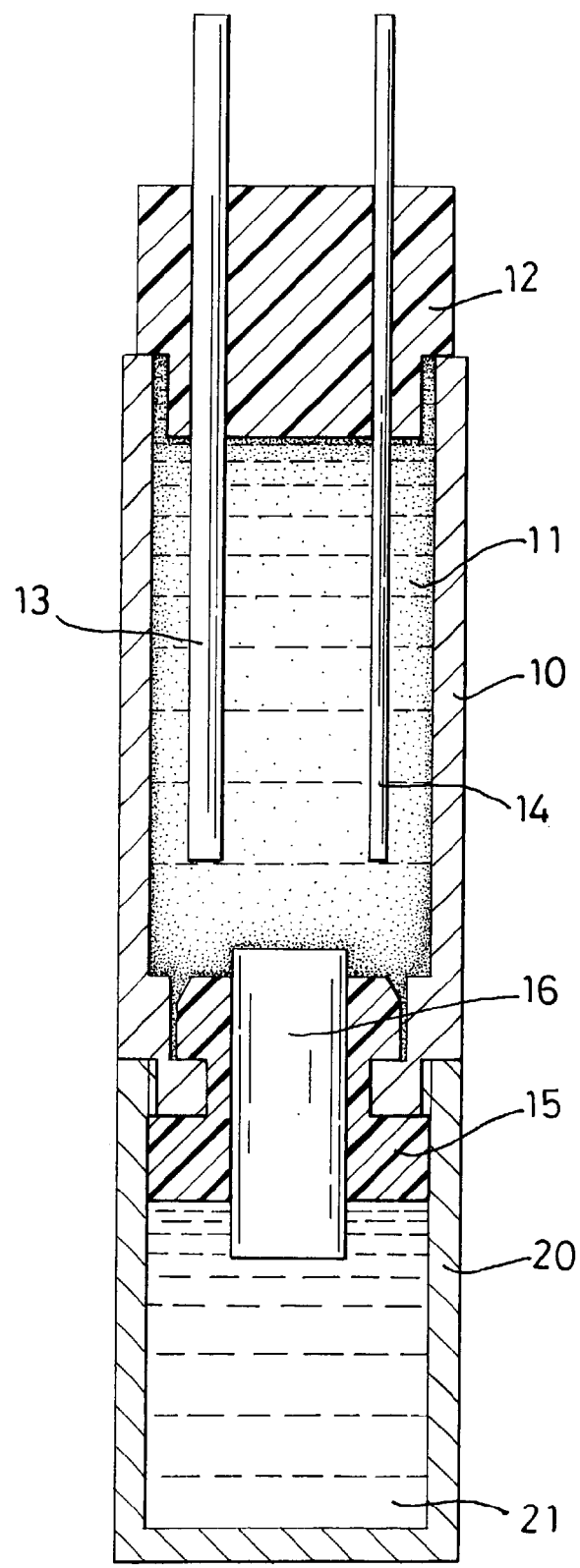
FIG. 1 is a cross-sectional view of a battery in accordance with the present invention.

With reference to FIG. 1, a battery in accordance with the present invention has a hollow body (10) with two openings that are respectively enclosed with a cap (12) and a stopper (15). The body (10) is filled with a fluid material (11) composed of active carbon powder and water. Two conductive rods (13) (14) functioning as the two opposite electrodes of the battery extend through the cap (12) to contact with the fluid material (11). The first electrode (13) is composed of an alloy of magnesium and aluminum, and the material for the second electrode (14) is copper.

The stopper (15) is integrally formed with an upper portion, a lower portion and a narrow neck portion therebetween. The upper portion is retained inside the body (10). A water absorbent bar (16) extends through the stopper (15), and one end of the absorbent bar (16) enters the body (10) and contacts with the fluid material (11).

A receptacle (20) containing water (21) is detachable screwed to the body (10), whereby the lower portion of the stopper (15) is retained in the receptacle (20) and the other end of the water absorbent bar (16) is dipped in the water (21).

When the absorbent bar (16) dipped in the water (21) becomes saturated, the water (21) is drawn into the body (10) because of the capillary feature of the bar (16) and the water (21) causes a reaction between the two rods (13)(14). Thereby, the battery can generate electricity approximately equal to 1.5 volts. As described foregoing, since there is the fluid material (11) composed of water in the body (10) before the receptacle (20) is attached to the body (10), the water (21) in the receptacle (20) is used as the supplement liquid.

With such an arrangement, one advantage of the battery is that the electrolyte residue generated during the chemical reaction will not pollute the water (21) because the two electrode rods (13)(14) are not directly in contact with the water (21). Thus the use life of the battery is prolonged in comparison to conventional batteries.

Moreover, since the receptacle (20) is able to be detached from the body (10) when the water (21) is exhausted, users can easily and conveniently refill the receptacle (20) with water at any place.

The foregoing description of the preferred embodiments of the present invention is intended to be illustrative only and, under no circumstances, should the scope of the present invention be restricted by the description of the specific embodiment.

What is claimed is:

1. A battery for electrical appliances that consume low voltage battery, the battery comprising:
    a hollow body having a top opening and a bottom opening that respectively are enclosed with a cap and a stopper, wherein two conductive rods functioning as opposite electrodes of the battery extend through the cap into the body to contact with a fluid material composed of active carbon powder and water contained in the body;

a receptacle containing water and detachably attached to the body;

a water absorbent bar inserted through and held by the stopper, wherein a first end of the water absorbent bar enters the body and contacts with the fluid material, and a second end of the water absorbent bar is in contact with the water in the receptacle;

wherein one of the two conductive rods is composed of copper, and the other rod is composed of an alloy of magnesium and aluminum.

2. The battery as claimed in claim 1, wherein the receptacle is detachably screwed to the body.

* * * * *